Dec. 2, 1958   A. T. C. BURROWS   2,862,600
CONVEYOR SYSTEMS
Filed June 16, 1954   8 Sheets-Sheet 5
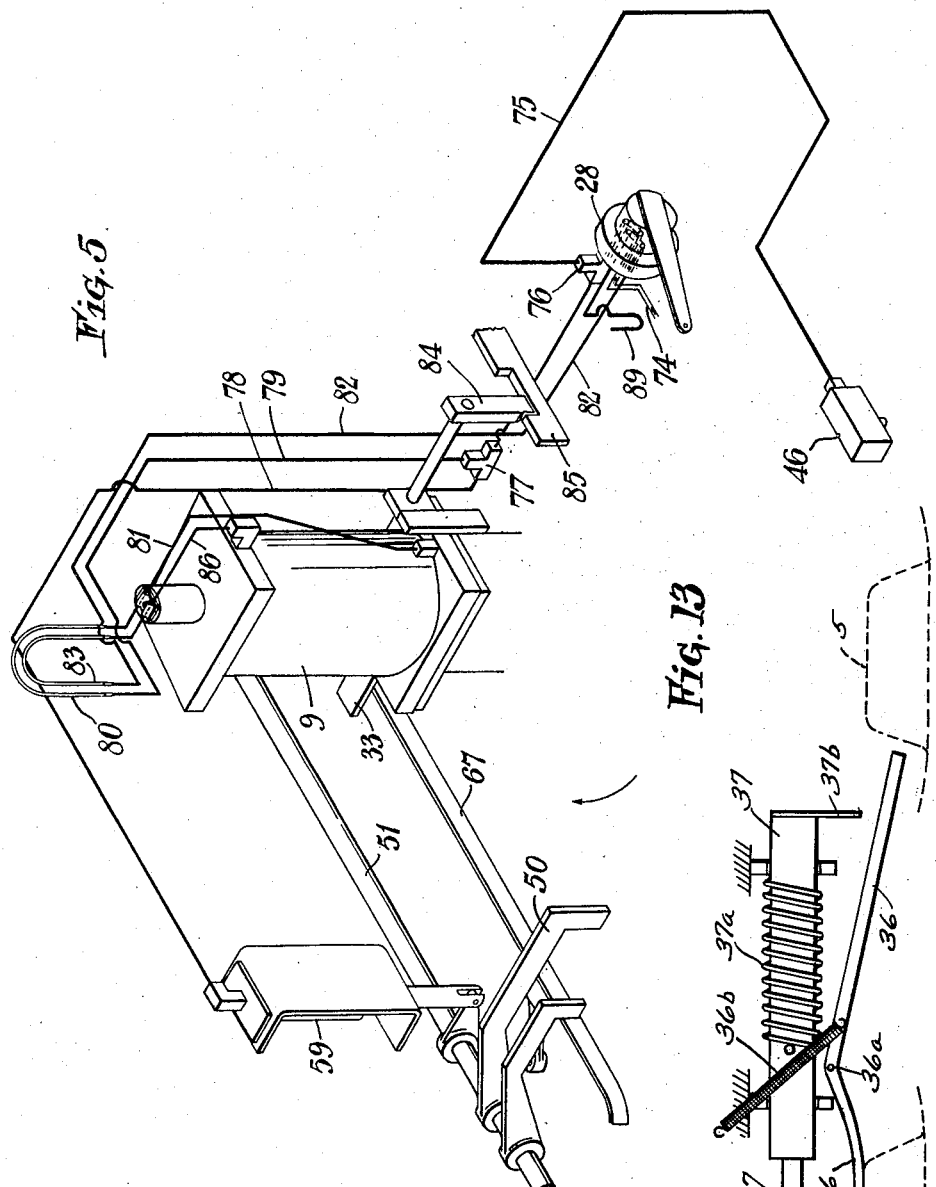

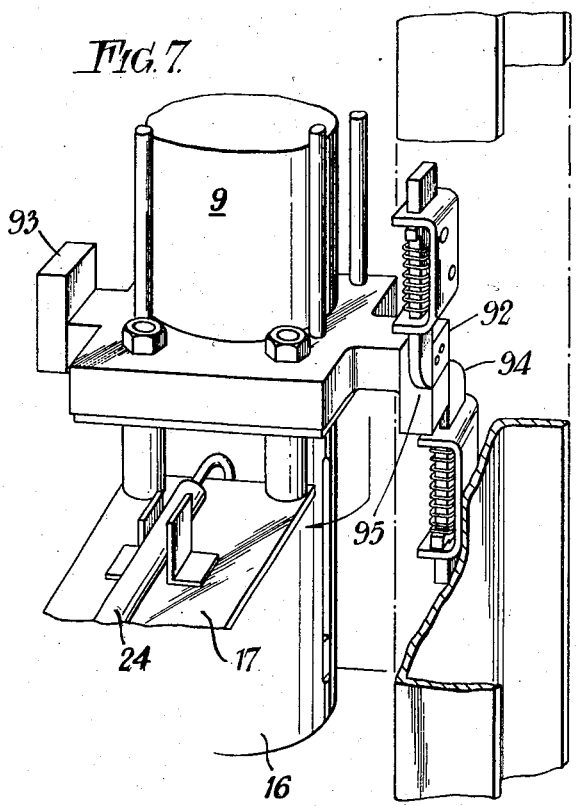
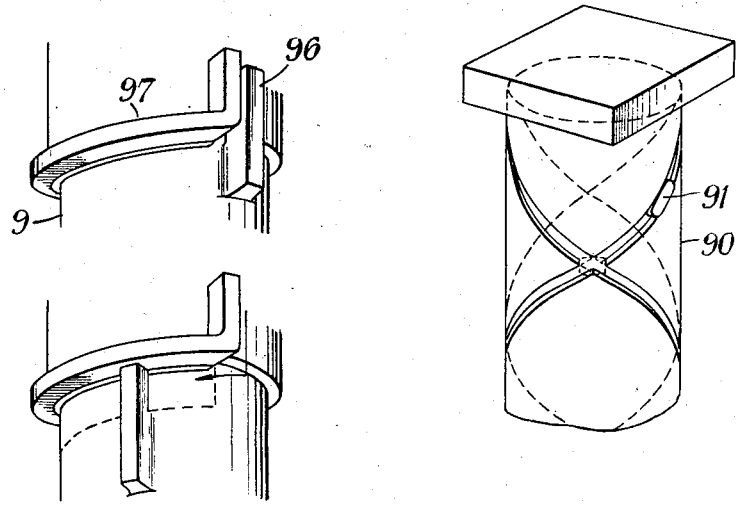

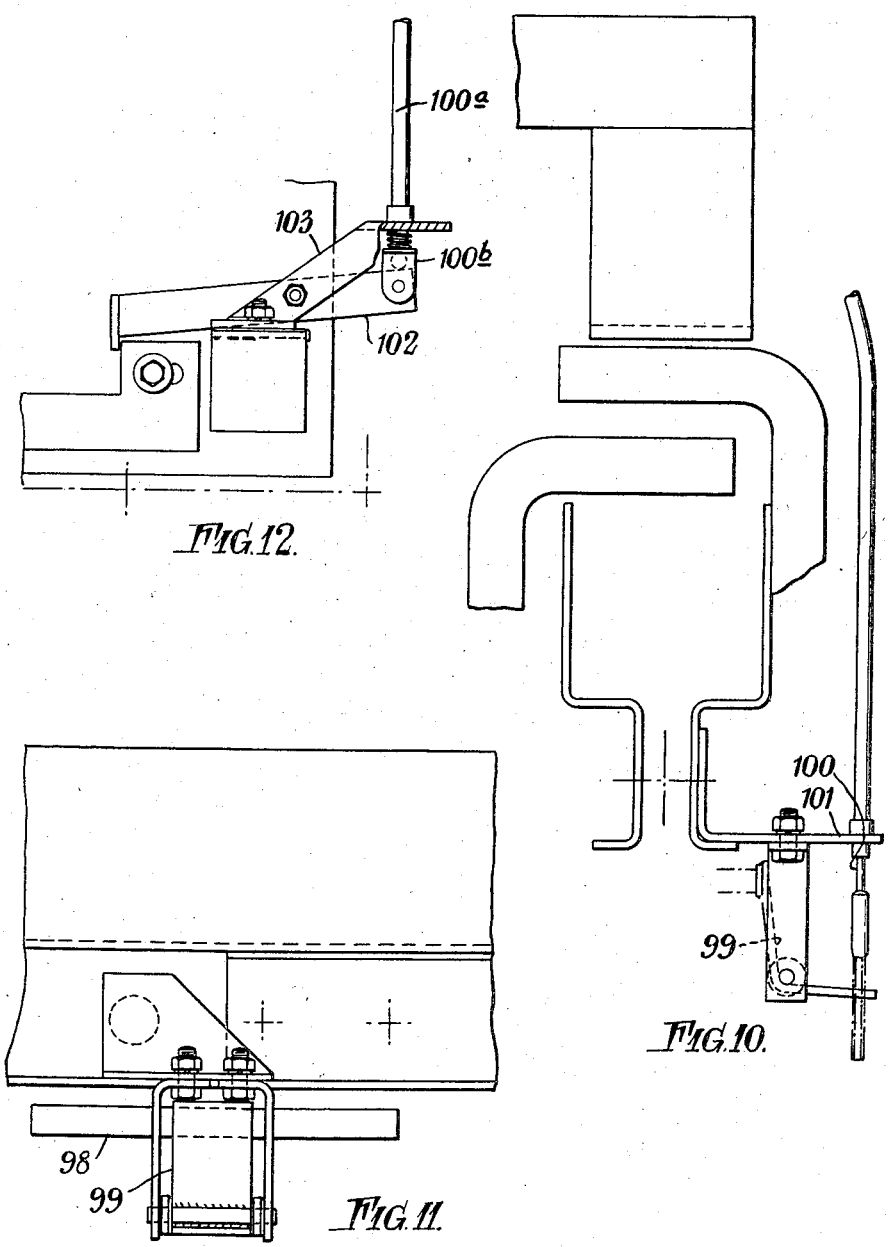

United States Patent Office 2,862,600
Patented Dec. 2, 1958

2,862,600

CONVEYOR SYSTEMS

Arthur Thomas Charles Burrows, Stevenage, England, assignor to Geo. W. King Limited, Stevenage, England, a British company Application June 16, 1954, Serial No. 437,173

Claims priority, application Great Britain June 19, 1953

8 Claims. (Cl. 198—20)

This invention relates to conveyor systems and more particularly to such systems wherein load carriers are supported on an endless chain to which a drive is imparted, the arrangement being such that while the carriers will normally be driven by the chain they may nevertheless be stopped or moved relatively to said chain without interrupting the drive to the latter.

According to the present invention, a conveyor system incorporates two or more endless chains which are disposed to travel in proximity to each other at one or more predetermined points and means are provided to effect transfer of load carriers from one chain to the other at such point or points.

In order that the said invention may be clearly understood and readily carried into effect, an embodiment arranged for automatic control by the load carriers will be hereinafter more fully described with reference to the accompanying drawings, in which:

Figure 5 is a diagram illustrating an operating fluid circuit whereby actuation of the transfer unit and its associated parts may be effected or controlled;

Figure 6 shows a modified type of operating screw which may be incorporated in the transfer unit to effect angular movement of a transfer arm forming part of such unit;

Figure 7 shows a modified arrangement for controlling the operation of the transfer arm;

Figure 9:
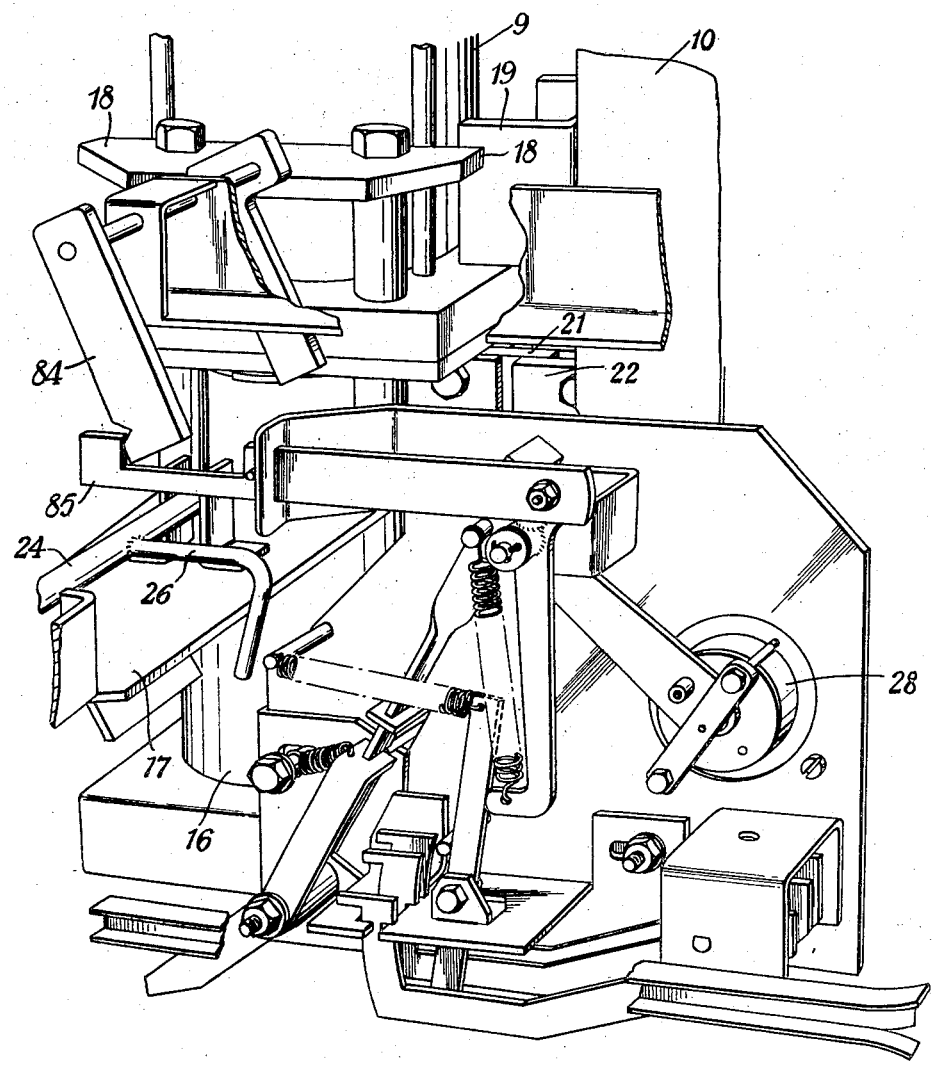

Figure 8 indicates one method of obtaining variations in the path of the transfer arm during transfer;

Figure 9 is a perspective view of a selector mechanism which is associated with the transfer unit but which per se forms no part of the present invention;

Figures 10, 11 and 12 illustrate a mechanism adapted to be used when, for example, a returning unloaded carrier must not be transferred, although the selector key or the like on the carrier frame is set to cause transfer; and Figure 13 illustrates diagrammatically the operation of a stop provided in the apparatus.

Figure 1:
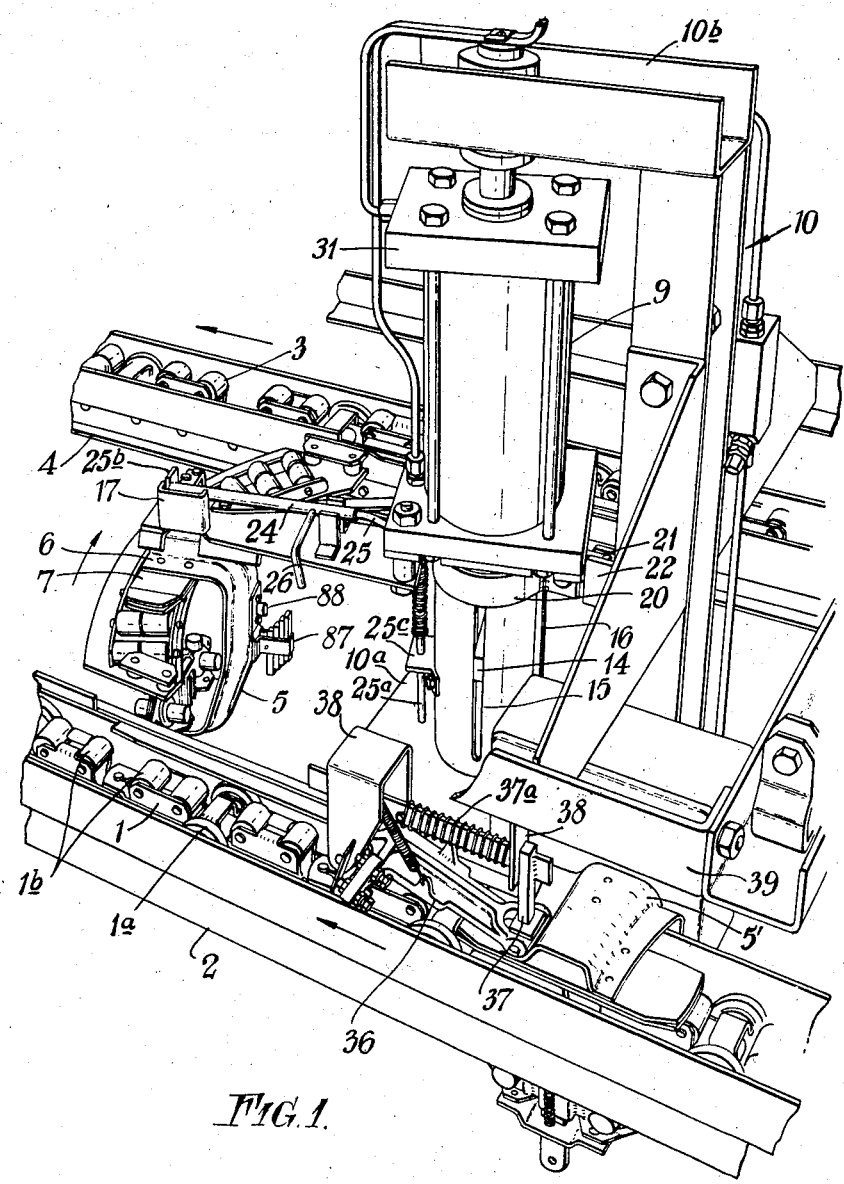
Figure 1 is a perspective view of a transfer unit showing a load carrier being transferred from a feeder to a receiver conveyor, part of the supporting structure having been removed to permit of better illustration.
Figure 2:
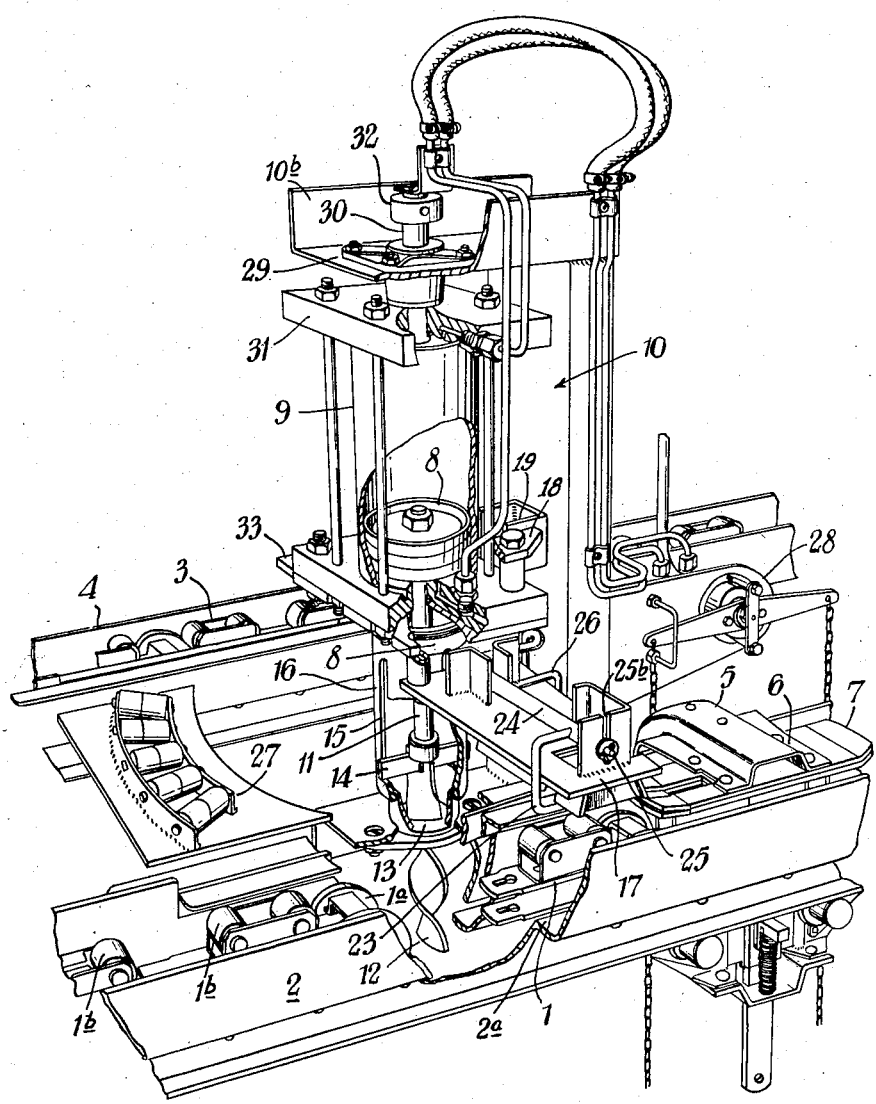
Figure 2 is a perspective view taken from another position of the transfer unit and operating gear therefore, parts being broken away and the supporting structure for said unit being removed to permit of better illustration.

Referring now to the drawings and more particularly to Figures 1 and 2, 1 denotes an endless chain to which a drive is imparted in any convenient manner, such chain being adapted to run in a fixed overhead channel or track 2 of substantially box like section. The chain which incorporates a plurality of rollers 1a adapted to run on the inner surfaces 2a (Fig. 2) of the channel or track 2 also incorporates at its upper part a plurality of rollers 1b in spaced relationship along the chain to form a substantially continuous support for the load carriers. Such a chain is described in the United States patent application No. 292,627. The chain and track referred to above and designated 1 and 2 constitute what will be hereinafter termed the "feeder conveyor."

At any point along the feeder conveyor whereat load carriers are required to be diverted from the path of chain 1, a subsidiary chain 3 of similar type may be provided, such chain being disposed in a channel or track 4 and the arrangement being such that for a portion of its length, said chain 3 will be disposed substantially parallel to and in the same horizontal plane as the feeder chain 1. The chain and track designated 3 and 4 constitute what will be hereinafter termed the "receiver conveyor".

In order to allow transfer from one chain to the other each load carrier will comprise a frame or carriage 5 of substantially C shape in side elevation. As will be seen from Figure 2 the load carrier is so disposed with respect to chain 1 that a shoe 7, attached to the upper limb 6 of the frame 5, rests on the rollers 1b on the top of said chain while the upright limb of frame 5 is at the side of the track 2 facing toward the receiver conveyor. A load carrier of the same general construction as that indicated above is described more fully in the specification of prior patent application No. 292,627. During transfer, the carrier will be turned through 180 degrees about a vertical axis situated midway between the feeder and the receiver conveyors.

The mechanism hereinafter referred to as the transfer unit comprises a vertically disposed ram 8 (Fig. 2) adapted to be operated by means of, for example, compressed air, said ram being disposed within a cylinder 9 which is supported within a framework designated generally by 10 in such a manner as to be capable of rotation and of limited axial movement relative to the latter. A rod 11 extends downwardly from the ram 8, said rod carrying at its lower end a screw 12 which extends through a combined fixed nut and bearing 13 mounted in a lower horizontal limb 10a of the frame 10, so that on axial movement of the screw 12 the ram 8 will be forced to rotate, the direction of rotation being decided by the handing of the screw. The screw 12 is provided with lateral extensions 14 which slide in diametrically opposed vertical slots 15 in an extension 16 of the ram cylinder 9 to prevent relative rotary movement between the ram cylinder 9 and the screw 12, that is, to cause the cylinder 9 to rotate with the screw 12 and the ram 8. 17 denotes a horizontally projecting transfer arm which is attached to the ram cylinder 9, said arm being adapted on actuation to engage the upper limb 6 of the load carrier frame 5 and to effect transfer thereof from the feeder to the receiving conveyor as will be hereinafter more fully described. The ram cylinder 9 is provided with a laterally directed abutment 18, adapted to engage a stop bracket 19 fixed to the frame 10, as shown in Fig. 9, said abutment and stop bracket being arranged to engage each other in two positions of the transfer arm, in this particular case in positions of the arm 17 which are angularly spaced apart by 180 degrees. A band brake 20 (Fig. 1) is clamped around the extension 16 of the ram cylinder 9, and has an outwardly extending radial abutment 21 which slidably engages in a fixed guide 22 attached to the main frame 10, so that the band brake 20 can move vertically with the cylinder 9 while being restrained against rotation. Due to the pressure in the end clearances within cylinder 9, the initial supply of working fluid to the latter will produce axial movement of the cylinder while the band brake 20 will be effective, during such initial axial movement of the cylinder at either end of the stroke of the ram 8, to prevent any tendency to rotation of cylinder 9. As working fluid is supplied to the cylinder and the latter reaches the limit of the axial movement thereof permitted by its mounting in frame 10, the friction exerted by brake 20 is overcome and rotary motion of the ram 8 and cylinder 9 will take place, as described above. The numeral 23 denotes a load carrier stop which is inoperative except when a load is being transferred, said stop being attached to a tubular support 24 which is rotatably journalled on a spindle 25. The spindle 25 is of L-shape, Fig. 1, the downwardly extending vertical leg 25a thereof being adapted to rest and to slide on the lower horizontal limb 10a of the frame 10, vertical guides 25b and 25c being provided on the transfer arm 17 and on the ram extension 16 to control the movement of the said spindle 25. Also attached to and moving with the tubular support 24 is an arm 26 which is adapted to co-operate with a sliding plate incorporated in a selector mechanism shown generally in Fig. 9, but forming no part of the present invention per se, such selector mechanism being more fully described in U. S. patent application, Serial Number 472,399, and the arrangement is such, that, if a load carrier is to be transferred, the selector mechanism will be operated to cause the above mentioned sliding plate to abut against the arm 26. If no transfer is to be effected, abutment between the sliding plate of the selector mechanism and the arm 26 will not take place since the sliding plate will not be moved to its full extent. When transfer is to take place and the sliding plate of the selector mechanism abuts the arm 26, the stop 23 constitutes a rigid abutment which will hold the load carrier in position ready for transfer from the feeder to the receiver conveyor. A curved roller platform 27 is located between the feeder and the receiver tracks 2 and 4 to support the load carrier during transfer. 28 designates a control valve whereby working fluid may be supplied to the ram cylinder 16 either above or below the ram 8 as required, at least part of the conduit through which such fluid flows being of a flexible nature or arranged in such manner as to allow for rotation of the ram assembly. 29 denotes a bearing assembly which is mounted on the upper horizontal limb 10b of the frame 10, and receives a spindle 30 extending from a ram head 31 at the upper end of ram cylinder 9. The bearing assembly 29 is adapted to form an axial abutment for the ram head 31 and also for a collar 32 which is mounted on the upper end of spindle 30, the latter being slidable axially and also rotatably journalled in the bearing assembly. The degree of axial movement of the spindle 30, and hence of the ram cylinder 9, is determined by the excess of the working length of the spindle 30 over the length of the bearing assembly while the degree of angular movement is determined by the form and location of the lateral abutment 18 associated with the ram cylinder or its extension and the stop bracket 19 with which such abutment co-operates (Fig. 9).

The supply of working fluid to the ram cylinder 9 is controlled by means of the valve 28, the operation of which is, in turn, controlled by means of the selector mechanism referred to above which is, in turn, adapted to be actuated by the load carriers. Reversal of the valve 28 automatically at the end of the transfer movement of the arm 17 may be brought about by means of an arm 33, which is rigidly attached to the ram cylinder 9 or to the extension 16 of the latter, said arm being adapted to co-operate with a bell crank 84 (Figure 9) which in turn co-operates with a slotted bar 85 forming a part of the selector mechanism above referred to.

Figure 3:
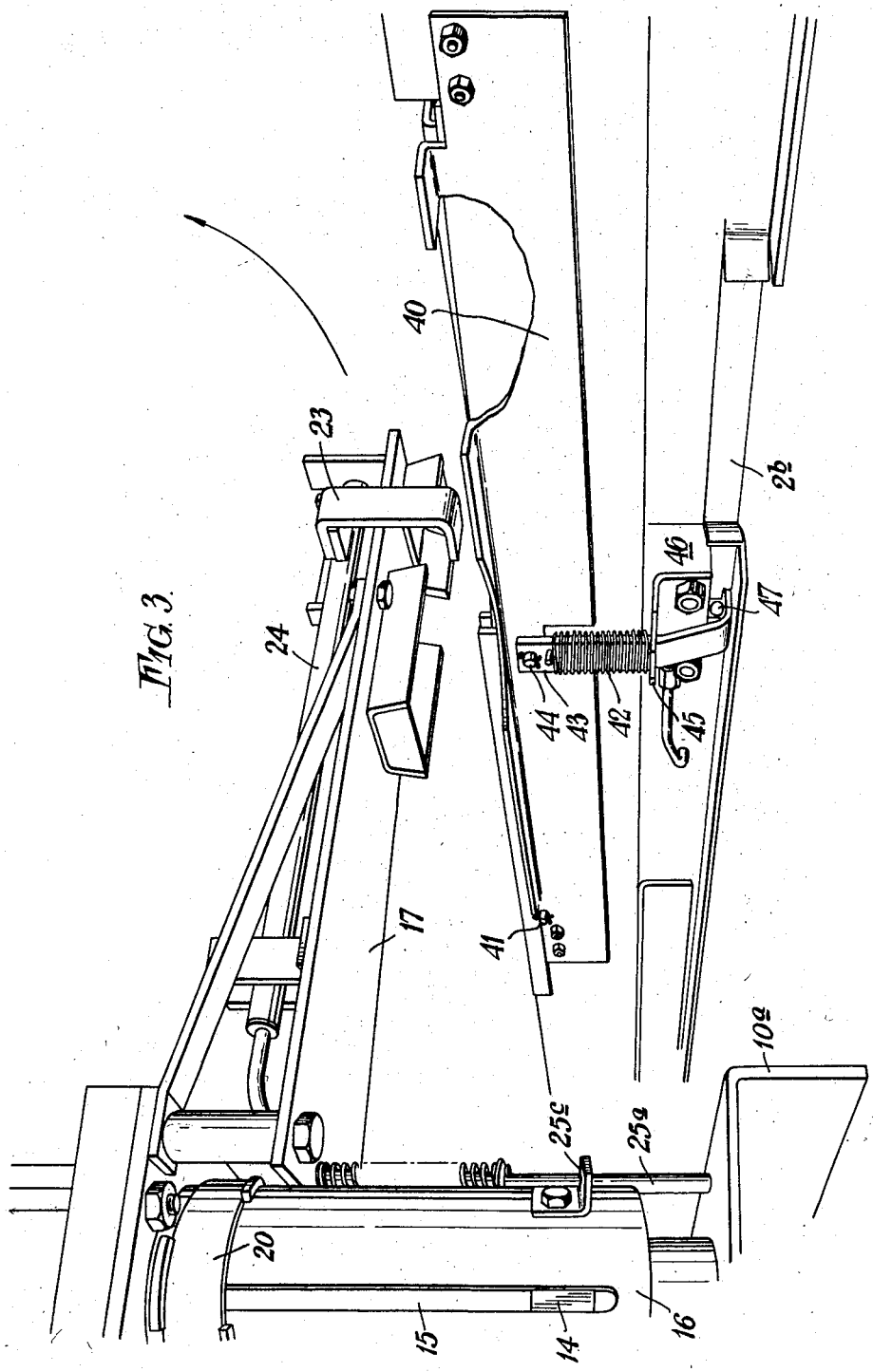
Figure 3 is a perspective view of a retractable guide and its associated operating mechanism and also of a stop mechanism for load carriers viewed from the transfer unit side of the feeder conveyor.

As shown in Figure 1, a load carrier 5 is in the process of being transferred from the feeder to the receiver conveyor while a following load carrier on said feeder conveyor is held by a rocking stop 36, which in turn is held in its operative position by a spring loaded sliding stop 37 during such time as the transfer arm 17 is turned away from its rest position, i. e. the position at which it is perpendicular to and facing the feeder track 2. The stops 36 and 37 are supported by and move in a composite bracket 38 which is in turn supported by a structural member 39. The arrangement is such that immediately prior to transfer of a load carrier, the latter will rock the stop 36 into its operative position where it is held by that carrier until transfer commences. During that time the following carrier is held out of contact with the first mentioned carrier and the stop 37 is held in its inoperative position by the transfer arm 17 which engages the forward end of slidable stop 37 to oppose forward movement of the latter by its spring 37a. As transfer commences and the arm 17 swings away from the stop 37, the latter will slide forwardly under the action of its spring 37a over the end of the stop 36 before the first carrier has moved out of contact with the latter and consequently resetting or release of said stop 36 will be prevented until the transfer arm 17 returns and resets said stop 37 thereby to release the stop 36 and allow free passage of the next following carrier 5′ under the stop 36. To allow for the free passage of any carrier during transfer the upper portion of the inside member of the track 2 must be retracted. Referring now to Figure 3, 40 denotes a retractable guide which forms the upper portion of the inside member of the track 2 and is pivoted adjacent one end on a spindle 41, said guide being held in its uppermost position wherein it is in alignment with the remainder or fixed part of track 2 by means of a spring 42 and link 43. The link 43 is pivoted at its upper end on a pin 44 carried by said guide 40 while at its lower end, said link slides in a guide plate 45, which is attached to the inner track member. To effect retraction of the guide 40 a ram cylinder 46 is provided at the side of the inner track, and an extension 47 of the piston in the cylinder 46 engages a horizontal shoe forming an extension of the link 43 so that, when working fluid is supplied to the cylinder 46 to move extension 47 downwardly, the link 43 is depressed and retracts the guide 40.

Figure 4:
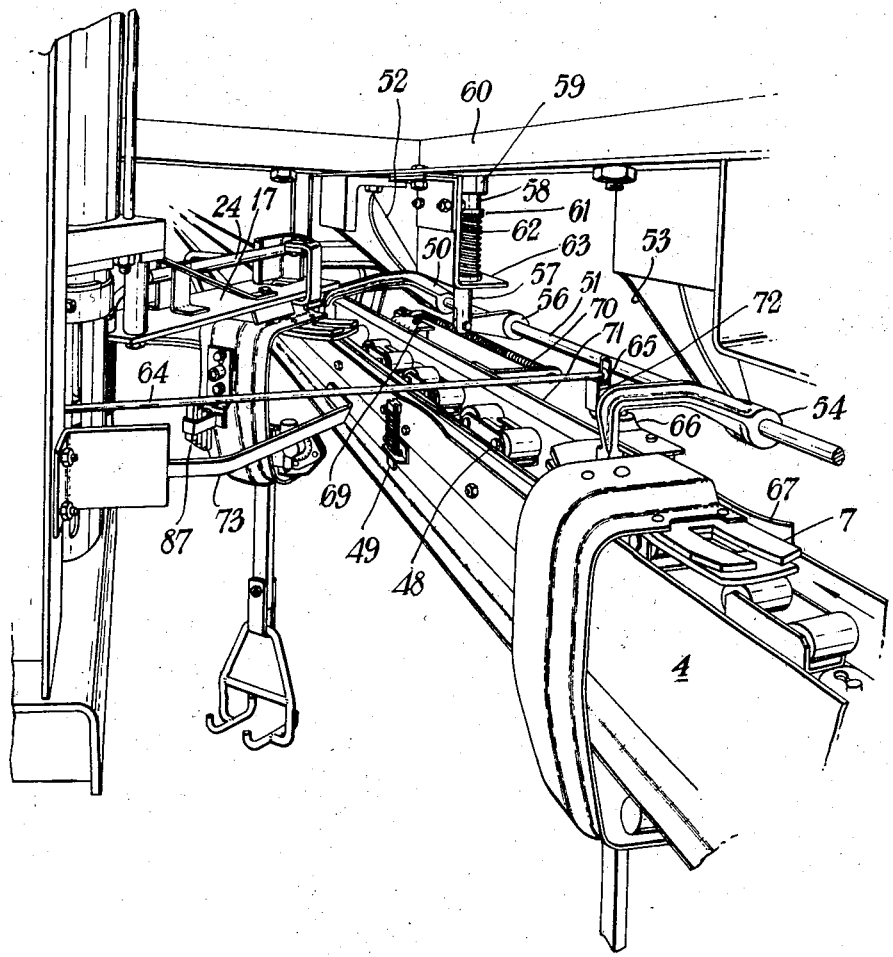
Figure 4 is a perspective view of the retractable guide, a safety gate, the load carrier stop and its associated operating mechanism viewed from the transfer side of the receiving conveyor.

In the same way the upper portion of the inside member of the track 4 must be retracted during transfer to allow free entry of the carrier on to the receiver chain 3. Referring to Figure 4, 48 denotes a retractable guide which is supported by a link 49 in a similar manner to that described for the retractable guide 40 of the feeder conveyor. Retraction of the guide 48 is brought about by a finger 50 which is adapted on operation to press on the top edge of the guide as shown, said finger 50 being rigidly attached to a countershaft 51 which is in turn supported by bearing brackets 52 and 53. The countershaft 51 which is located adjacent to the outer member of track 4 also carries another finger 54 which serves as a stop for the load carriers, so keeping the transfer zone of the receiver conveyor free of carriers which would otherwise obstruct the path of the carrier being transferred. Also attached to the countershaft 51 is an arm 56, the opposite end of which is pinned to an extension 57 of a ram plunger 58, the ram 59 being attached to the supporting structural member 60. The plunger 58 has a collar 61 which serves as an abutment for one end of a spring 62, the other end of which bears against a shelf 63 which is an extension of the supporting members 60. It will be appreciated that the spring 62 serves normally to hold the plunger 58 at its highest position and consequently the fingers 50 and 54 are held sufficiently high to free the finger 50 from guide 48 and to allow free passage of the carriers under finger 54 when the transfer unit is inoperative.

It will be appreciated that the lower parts of the inner members of tracks 2 and 4 must be cut away in the region of the transfer point, for example, as at 2b (Fig. 3) in order to clear the lower guide rollers of the carriers.

Again referring to Figure 4 means are provided to prevent the transfer unit operating if a previously transferred carrier remains in the receiving area of the receiver conveyor even though the selector mechanism has been fully operated and a carrier is held ready for transfer. As shown, such means conveniently comprise a bolt 64 having one end supported by a bearing plate or the like associated with the selector mechanism and adapted to lock the linkage by which the latter operates the valve 28. The other end of the bolt 64 is supported by a leaf spring 65 carried on one arm of a bell crank 66, the other arm of said crank being attached to a skid 67 which is adapted to engage the shoe 7 of a carrier in the receiving area of the receiver conveyor. A similar bell crank 69 may be used to support the other end of the skid 67, which will therefore move in a horizontal plane in parallel relationship to the conveyor axis. The other arm of the bell crank 69 may form an anchorage for one end of a tension spring 70, which, at its other end, may be anchored to a bracket 71 attached to the outer member of track 4, this arrangement urging the skid 67 towards the centre of the receiving track. The finger 54 is shown positioned for movement of the receiver conveyor in the direction shown by the arrow and, in the event that the receiver chain travels in the reverse direction, finger 54 would be placed at the opposite end of countershaft 51 beyond the finger 50. Also attached to the arm of the bell crank 66 which supports the leaf spring 65 is a rigid abutment 72 which co-operates with the spring 65, the combination giving a force of relatively low value directed along the bolt 64 towards the feeder conveyor and a larger force in opposite direction. This arrangement prevents the jamming of the valve operating linkage by the bolt 64 due to friction between the end of said bolt and the linkage when a load carrier is bearing against the skid 67 and is held by the finger 54 during transfer of a carrier and yet it will allow withdrawal against the frictional drag caused by the valve operating linkage on the bolt when the transfer selector mechanism is in the operative setting but is prevented from operating by the bolt 64 owing to the presence of carriers which have passed the finger 54 but are still bearing against the skid 67 thus indicating that it is unsafe for the transfer mechanism to operate.

Referring now to Fig. 5, which shows the circuit for the working fluid, it will be seen that a conduit 74 extends from a source of fluid under pressure (not shown) to the control valve 28. 75 denotes a conduit through which, on operation of valve 28 by the selector mechanism, working fluid is supplied to the ram 46 for retracting guide 40 via one branch of a T connection piece 76. The other branch of the piece 76 is adapted to supply working fluid via the T piece 77 to the conduits 78 and 79. The conduit 78 communicates with the ram 59, while the conduit 79 communicates, via the flexible conduit 80 and the conduit 81, with the lower end of ram cylinder 9. Conduits 82, 83 and 86 are adapted to supply working fluid to the upper end of the ram cylinder 9 on reversal of the valve 28.

To illustrate the operation of the transfer unit it will be assumed that one load carrier is approaching the transfer unit along the feeder conveyor and is followed by a second carrier. The carrier has attached thereto at its rear part an adjustable key 87 which (visible in Fig. 1) is adapted to be preset to initiate operation of the selector mechanism controlling the operation of valve 28. It will be seen that the load carrier is also provided with a roller 88 which is engageable with a fixed guide rail appropriately disposed in relation to the selector mechanism thereby to ensure accurate vertical alignment of the key and movable finger elements of the selector mechanism. As already described, the carrier stop 23 will be locked to prevent further motion of the carrier along the feeder conveyor. Assuming that carriers are passing through the transfer zone of the receiver conveyor, the bolt 64 will prevent the complete operation of the selector mechanism owing to the said carriers displacing the skid 67 as already described. When carriers have passed through the transfer zone of the receiver conveyor, however, the skid 67 will reset and the bolt 64 will be withdrawn thereby to allow operation of the selector mechanism and consequent operation of the valve 28 controlling the supply of working fluid to the operative parts of the transfer unit. As indicated above with reference to Fig. 5, the valve 28 is adapted, on operation, to cause the working fluid to be diverted along conduits 75, 78 to the rams 46 and 59 and also along conduits 79, 80 and 81 into the lower part of the ram cylinder 9. Due to the end clearance in the ram cylinder, the latter will initially move axially downward and any tendency to rotate will be prevented by the brake 20 until further downward axial movement is prevented by the abutment of the collar 32 against the bearing assembly 29. This downward movement causes the outer end of the transfer arm 17 to engage the carrier held by the stop 36 as will later be explained with reference to Fig. 13. Further supply of the working fluid will cause the ram piston 8 to rise thus moving the screw 12 axially relative to the fixed nut 13 and causing rotation of the screw. By reason of the engagement of the extensions 14 in the slots 15 of the extension 16 of cylinder 9, this upward movement of the piston 8 and consequent rotational movement of the screw 12 will result in rotation of the complete ram unit including the arm 17 which takes the carrier with it. During rotation of the ram unit the carrier will be moved by the arm 17 from the feeder chain 1 over the retracted guide 40 across the roller platform 27, over the retracted guide 48 and on to the receiver chain 3. The transfer arm 17 will then have turned through 180 degrees and the arm 33 will engage the bell crank 84 which will be effective to bring about reversal of the valve 28, as is more fully described in the above identified application Serial Number 472,399. During the time which the carrier 35 has been transferred from the feeder to the receiver track, the fluid on the other side of the piston 8 has been exhausted via conduits 86, 83 and 82 the valve 28 and the exhaust line 89. On reversal of the valve 28, the working fluid from the supply line 74 will be supplied via conduits 82, 83 and 86 into the upper part of the ram cylinder 9 and the fluid below the piston 8 will be exhausted via conduits 81, 80 and 79, valve 28 and exhaust line 89. Due to the end clearance in the cylinder 9, and to the fact that the latter is restrained from rotation by the action of the brake 20, the cylinder 9 will ascend until further axial movement is prevented by the ram head 31 bearing against the bearing support 29. This action causes the transfer arm 17 to be raised until it is clear of the carrier. Further action of the working fluid causes the ram piston 8 to descend thus turning the screw 12 in the fixed nut 13. As before, the extensions 14 will move in the slots 15 thereby causing rotation back to its initial setting of the complete ram unit, the carrier which has been transferred remaining on the receiver track. As the carrier is placed on to the receiver track the skid 67 will be displaced and the bolt 64 will be urged to move towards the selector mechanism, but as previously explained the leaf spring 65 will deflect and the resulting force along the bolt 64 will be insufficient to prevent the reversal of the valve 28 with consequent reversal of the transfer unit. Immediately after the reversal of the valve 28 occurs, the rams 46 and 59 are exhausted, thus allowing the retractable guides 40 and 48 to reset and fingers 50 and 54 to be retracted clear of the path of the load carriers on the receiver track. Following transfer of the carrier the transfer unit will be unable to operate again at least until the transferred carrier has moved clear of the skid 67 and should further carriers travelling along the receiver conveyor engage the skid 67 before the exit of the transferred carrier, the unit will further by prevented from operating until such further carriers are also clear of the skid 67. 73 is a guard which may be necessary to prevent accidental displacement of a load carrier from the receiver conveyor after transfer to the latter.

It will be realized that certain components of the combination already described may be omitted according to circumstances; for example, should there be no carriers moving toward the transfer unit on the receiver track at any time, transfer may be effected at will and finger 54, leaf spring 65, bolt 64 and stop 72 all become unnecessary.

Referring to Figure 6, 90 denotes an operating cam cylinder which may be employed in place of the screw 12, the cam cylinder 90 having opposite hand double start helical channels. In such a case two keys 91 would be arranged to slide in the helical slots, the hand of the slot in which each key moves being decided by the angular setting of the keys. The incorporation of a cam cylinder such as that indicated in Figure 6 would eliminate the need for handed screws 12 and furthermore it would then be possible to arrange for the transfer to rotate through the complete angle of 360 degrees using the means just described, by arranging for the keys 90 to be set at a suitable angle for operation during the rotation from 0 degrees to 180 degrees and reset at an equal angle on the other side of the vertical during movement from 180 to 360 degrees. In such a case the direction of the rotation would be decided by the initial setting of the keys 91 on one side or the other of the vertical.

The use of a brake 20 to obtain axial movement of the ram cylinder 9 before rotational movement may be avoided by means of an arrangement such as is shown in Figure 7. In this case arms 92 and 93 are rigidly attached to the end plate of the ram cylinder and are adapted to co-operate with pawls 94 and 95. In the embodiment illustrated in Figure 7, the arm 92 has previously displaced the appropriate pawl 94 to reach the setting shown, the ram having reached its lowest position. Further rotational movement of the ram in the same direction will be prevented owing to the reversal of the valve gear and in any case by pawl 95. On reversal of the valve gear, rotation in the reverse direction will be prevented by the pawl 94 engaging the arm 92 and as a consequence the ram cylinder 9 will rise until the arm 92 passes over the top of pawl 94. The reverse of the above will occur when the arm 93 engages the pawl 95, this being at the rest position of the unit.

Figure 8 shows a further means of obtaining a cycle of movement of the arm 17 including a downward movement of the arm followed by a rotational movement and then a rotational movement in the reverse direction, followed by an upward movement. In Figure 8, 96 represents an arm moving with the ram cylinder 9 while 97 is an abutment of the shape shown rigidly attached to the frame 10. While the transfer arm is at rest position the ram cylinder 9 is at its highest position and the arm 96 will be at its maximum vertical engagement with the abutment 97. Upon operation of the transfer unit the working fluid will be transferred to the lower part of the ram cylinder 9 and rotational movement of the ram will be prevented by the arm 96 contacting abutment 97, consequently axial movement of said cylinder will occur until the arm 96 is able to pass along the underside of the abutment 97. On reversal of the valve mechanism, however, rotational movement only of the ram will occur in the reverse direction until arm 96 has passed from below the abutment 97 and is able to move vertically.

Figures 10–12 illustrate a mechanism to be used when, for example, a returning unloaded carrier must not be transferred, although the selector T on the carrier frame is set to cause transfer. In these figures, 98 denotes a skid which is set at a height to engage a peg in the load bar of a load carrier of the type described in the specification of prior patent application No. 292,627 when said load bar is at its highest position, indicating that there is no load carried by the carrier and attached sling. The skid 98 is supported by and attached to one arm of a bell crank 99 and the other arm of the latter is attached to one end of a Bowden cable 100. One end of the control tube 100a for the cable 100 is anchored to a bracket 101 attached to the side track at the side of the latter opposite to that on which the load carriers pass and is so arranged along the track that the selector mechanism is cancelled before the skid 98 resets. The other end of the Bowden cable 100 is attached to one end of a lever 102, as at 100b, and the other end of lever 102 acts as a latch to prevent operation of the selector mechanism as the carrier passes by, so that the transfer unit will not be operated. The lever 102 is carried by a bracket 103 which also anchors the other end of the controlling tube 100a of the Bowden cable 100.

With reference to Fig. 13, when a load carrier or trolley 5 is held by the stop 23 ready for transfer, the forward end of the lever 36 which is pivoted at 36a will sit on the top of the trolley and the tail end of such lever will depend into the path of and will form a stop to hold the next following trolley. When the transfer unit is operated, the transfer arm 17 will move away from the spring loaded sliding stop 37 which will then slide forwardly under the action of its spring 37a so that the tail piece 37b will engage the tail end of the lever 36 and hold it downwardly in its operative or stop position so that said next following trolley cannot reach the transfer point until the transfer arm 17 again returns to its initial position. Upon return of the transfer arm, the stop 37 will be forced rearwardly by said arm against the action of its spring thereby to release the lever 36 whereupon since there is no trolley in the path of the forward end of the lever 36 the latter will swing in counterclockwise direction under the action of the coil spring shown in Figure 1 and designated 36b in Fig. 13 so that the tail end will be lifted out of the path of the next following trolley which will then proceed to the transfer point wherein it will reset the lever 36 to its initial stop position thereby to prevent passage of a further trolley.

What is claimed is:

1. In a conveyor system including two separate driven chains each supporting load carriers and so arranged as to travel in side by side relationship and in relatively close proximity to each other over at least one section of their respective paths of travel; a transfer unit disposed at said one section and comprising a piston and cylinder assembly, means for directing a supply of motive fluid to said cylinder alternately at opposite sides of the piston, a screw element connected with said piston, a stationary element with which said screw element cooperates so that on axial movement of the piston a rotary motion will be imparted thereto, a sleeve like extension on said cylinder having axially directed slots therein, laterally directed projections on the said screw element slidably engaging in the slots in said sleeve like extension so that while relative axial movement between the piston and cylinder can take place rotational movement of said piston results in rotational movement of said cylinder, means restraining rotation of the cylinder and hence the piston during initial supply of fluid to said cylinder thereby to cause an initial axial displacement of said cylinder, and a transfer arm operatively connected with said cylinder to move therewith so that on supply of fluid to one side of the piston the transfer arm will make an initial vertical movement to engage a load carrier present on one chain and a subsequent rotary movement to transfer said carrier to the second chain, reversal of the supply of fluid to the opposite side of said piston resulting in a reverse initial vertical movement of said transfer arm out of engagement with the transferred carrier and a subsequent reverse rotary movement to restore said arm to its initial position.

2. In a conveyor system including two separate driven chains each supporting load carriers and so arranged as to travel in side by side relationship and in relatively close proximity to each other over at least one section of their respective paths of travel; a transfer unit disposed at said one section and comprising a piston and cylinder assembly, means for directing a supply of motive fluid to said cylinder alternately at opposite sides of the piston, a screw element coupled to said piston, a stationary element with which said screw element cooperates so that on axial movement of the piston a rotary motion is imparted thereto, a sleeve like extension on said cylinder having axially directed slots therein, laterally directed projections on the said screw element slidably engaging in the slots in said sleeve like extension so that while relative axial movement between the piston and cylinder can take place rotational movement of said piston results in rotational movement of said cylinder, a band brake operation to restrain rotation of said cylinder and hence of the piston during initial supply of fluid to said cylinder thereby to cause an axial displacement of said cylinder, and a transfer arm operatively connected with said cylinder to move therewith so that on supply of fluid to one side of the piston the transfer arm will make an initial vertical movement to engage a load carrier present on one chain and a subsequent rotary movement to transfer said carrier to the second chain whereafter reversal of the supply of fluid to the opposite side of said piston results in a reverse initial vertical movement of said transfer arm out of engagement with the transferred carrier and a subsequent reverse rotary movement to restore said arm to its initial position.

3. In a conveyor system including two separate driven chains each supporting load carriers and so arranged as to travel in side by side relationship and in relatively close proximity to each other over at least one section of their respective paths of travel; a transfer unit disposed at said one section and comprising a piston and cylinder assembly, means for directing a supply of motive fluid to said cylinder alternately at opposite sides of the piston, a screw element connected with said piston, a stationary element with which said screw element cooperates so that on axial movement of the piston a rotary motion will be imparted thereto, a sleeve like extension on said cylinder having axially directed slots therein, laterally directed projections on the said screw element slidably engaging in the slots in said sleeve like extension so that while relative axial movement between the piston and cylinder can take place rotational movement of said piston results in rotational movement of said cylinder, rigid projection means connected with said cylinder, spring loaded stop means with which said projection means cooperate to prevent rotation of said cylinder and hence of the piston during initial supply of fluid to said cylinder thereby to cause axial displacement of said cylinder sufficient to effect disengagement of said projection means from said stop means whereafter rotational movement of said cylinder and piston may take place and a transfer arm operatively connected with said cylinder to move therewith so that on supply of fluid to one side of the piston the transfer arm will make an initial vertical movement to engage a load carrier present on one chain and a subsequent rotary movement to transfer said carrier to the second chain, reversal of the supply of fluid to the opposite side of said piston resulting in a reverse internal vertical movement of said transfer arm out of engagement with the transferred carrier and a subsequent reverse rotary movement to restore said arm to its initial position.

4. A transfer unit as in claim 1 further comprising means which are adapted to be actuated by a preset device on a load carrier to effect operation of a stop which is effective to hold such carrier in such a position on said one chain that it will be engaged by the transfer arm.

5. A transfer unit as in claim 1 further comprising a stop member which is actuated on arrival of a carrier at the transfer unit, thereby to prevent passage of any succeeding carrier, and means to prevent such stop member from releasing said succeeding carrier until such time as the transfer of the first carrier has been completed and the transfer arm returned to its initial position.

6. A transfer unit as in claim 5, wherein the last mentioned means comprise a spring actuated latch member which co-operates with the transfer arm so that on movement of said arm from its initial position, said latch member moves under the action of its spring into the path of the stop member thereby positively to prevent release of said succeeding carrier by said stop member.

7. A transfer unit as in claim 6 and wherein stop means are disposed adjacent the second chain to which the carrier is to be transferred on operation of the transfer unit, such stop means on operation of the transfer unit preventing passage of load carriers along said second chain thereby to prevent obstruction of said one section of the related path of travel.

8. A transfer unit as in claim 7 further comprising means to prevent operation of the transfer arm and transfer of a carrier from said one to said second chain in the event that a carrier is already present on said second chain in said one section of the related path of travel.

References Cited in the file of this patent

UNITED STATES PATENTS

| | | |
|---|---|---|
| 344,222 | Thomas | June 22, 1886 |
| 2,120,052 | Bishop | June 7, 1938 |
| 2,611,493 | Nordquist | Sept. 23, 1952 |
| 2,647,613 | Lanunius et al. | Aug. 4, 1953 |